US008246456B2

(12) United States Patent
Motyl et al.

(10) Patent No.: US 8,246,456 B2
(45) Date of Patent: Aug. 21, 2012

(54) WAGERING GAME MACHINE WITH VIRTUAL INPUT DEVICE

(75) Inventors: Jim Motyl, Chicago, IL (US);
Peerapong Thumutok, Carol Stream, IL (US)

(73) Assignee: WMS Gaming Inc., Waukegan, IL (US)

( * ) Notice: Subject to any disclaimer, the term of this patent is extended or adjusted under 35 U.S.C. 154(b) by 204 days.

(21) Appl. No.: 12/665,099

(22) PCT Filed: Jun. 19, 2008

(86) PCT No.: PCT/US2008/007676
§ 371 (c)(1),
(2), (4) Date: Dec. 17, 2009

(87) PCT Pub. No.: WO2009/002441
PCT Pub. Date: Dec. 31, 2008

(65) Prior Publication Data
US 2010/0190548 A1 Jul. 29, 2010

Related U.S. Application Data

(60) Provisional application No. 60/945,679, filed on Jun. 22, 2007, provisional application No. 61/018,545, filed on Jan. 2, 2008.

(51) Int. Cl.
*A63F 13/00* (2006.01)
(52) U.S. Cl. ................. 463/34; 463/13; 463/31
(58) Field of Classification Search .............. 463/16, 463/20, 36, 37, 39, 13, 30, 31, 33, 34
See application file for complete search history.

(56) References Cited

U.S. PATENT DOCUMENTS

| 6,089,976 | A | 7/2000 | Schneider et al. |
|---|---|---|---|
| 6,154,131 | A | 11/2000 | Jones, II et al. |
| 6,311,976 | B1 | 11/2001 | Yoseloff et al. |
| 6,887,157 | B2 | 5/2005 | LeMay et al. |
| 7,084,857 | B2 | 8/2006 | Lieberman et al. |
| 7,942,744 | B2 | 5/2011 | Wells |
| 8,092,304 | B2 | 1/2012 | Hedrick et al. |
| 8,100,750 | B2 | 1/2012 | Luciano, Jr. et al. |
| 2004/0046744 | A1* | 3/2004 | Rafii et al. .............. 345/168 |
| 2004/0106446 | A1* | 6/2004 | Cannon et al. ............. 463/16 |
| 2005/0277467 | A1 | 12/2005 | Karabin et al. |
| 2006/0101349 | A1 | 5/2006 | Lieberman et al. |
| 2006/0160599 | A1* | 7/2006 | Tulley et al. ............ 463/16 |
| 2006/0166727 | A1 | 7/2006 | Burak |
| 2006/0258422 | A1 | 11/2006 | Walker et al. |
| 2007/0120834 | A1* | 5/2007 | Boillot ................... 345/173 |
| 2009/0233705 | A1 | 9/2009 | LeMay et al. |

OTHER PUBLICATIONS

"International Application Serial No. PCT/US2008/007676, Search Report and Written Opinion mailed Oct. 1, 2008", 11 pgs.

* cited by examiner

*Primary Examiner* — James S McClellan
(74) *Attorney, Agent, or Firm* — Schwegman, Lundberg & Woessner, P.A.

(57) ABSTRACT

A computerized wagering game system includes a gaming module comprising gaming code which is operable to present a wagering game on which monetary value can be wagered, and a virtual input device. The virtual input device is operable to receive input from a user by detecting a position of a user input object such as a finger.

26 Claims, 8 Drawing Sheets

_US 8,246,456 B2_

WAGERING GAME MACHINE WITH VIRTUAL INPUT DEVICE

RELATED APPLICATIONS

This patent application is a U.S. National Stage Filing under 35 U.S.C. §371 from International Patent Application Ser. No. PCT/US 2008/007676, filed Jun. 19, 2008, and published on Dec. 31, 2008 as WO 2009/002441 A1, which claims the priority benefit of U.S. Provisional Patent Application Ser. No. 60/945,679 filed Jun. 22, 2007 and entitled "VIRTUAL INPUT DEVICE IN A WAGERING GAME MACHINE" and of U.S. Provisional Patent Application Ser. No. 61/018,545 filed Jan. 2, 2008 and entitled "VIRTUAL INPUT DEVICE IN A WAGERING GAME MACHINE", the contents of which are incorporated herein by reference in their entirety.

FIELD OF THE INVENTION

The invention relates generally to user interfaces in a wagering game machine environment, and more specifically to a virtual input device in a wagering game machine.

LIMITED COPYRIGHT WAIVER

A portion of the disclosure of this patent document contains material which is subject to copyright protection. The copyright owner has no objection to the facsimile reproduction by anyone of the patent disclosure, as it appears in the Patent and Trademark Office patent files or records, but otherwise reserves all copyright rights whatsoever. Copyright 2008, WMS Gaming, Inc.

BACKGROUND

Computerized wagering games have largely replaced traditional mechanical wagering game machines such as slot machines, and are rapidly being adopted to implement computerized versions of games that are traditionally played live such as poker and blackjack. These computerized games provide many benefits to the game owner and to the gambler, including greater reliability than can be achieved with a mechanical game or human dealer, more variety, sound, and animation in presentation of a game, and a lower overall cost of production and management.

The elements of computerized wagering game systems are in many ways the same as the elements in the mechanical and table game counterparts in that they must be fair, they must provide sufficient feedback to the game player to make the game fun to play, and they must meet a variety of gaming regulations to ensure that both the machine owner and gamer are honest and fairly treated in implementing the game. Further, they must provide a gaming experience that is at least as attractive as the older mechanical gaming machine experience to the gamer, to ensure success in a competitive gaming market.

Computerized wagering games do not rely on the dealer or other game players to facilitate game play and to provide an entertaining game playing environment, but rely upon the presentation of the game and environment generated by the wagering game machine itself. Incorporation of audio, video, and mechanical features into wagering game systems enhance the environment presented are therefore important elements in the attractiveness and commercial success of a computerized wagering game system. A variety of complex graphics and video capabilities are also often provided via one or more specialized graphics processors, including the ability to decode and render full motion video, and to render complex three-dimensional graphics. Further, the variety of features available to wagering game players in some computerized wagering game systems use a variety of user interfaces.

Users typically no longer use a single pull-arm or a simple button to interact with a wagering game machine, but use touchscreen video prompts and other sophisticated interfaces to provide other types of input to a wagering game machine. Touchscreens enable user selection from among a variety of customizable input types, as the displayed image behind the touchscreen can be changed depending on the desired user input, such as selecting a game to play, selecting cards to keep in a card game, or selecting a path in proceeding through a theme-based game.

But, some wagering game systems benefit from a greater variety of user inputs or user inputs offering further diversity in input type, such as portable wagering game systems that might have a relatively small touchscreen display space. It is therefore desirable to provide user interfaces having a variety of input capabilities.

SUMMARY

One example embodiment of the invention comprises a computerized wagering game system including a gaming module comprising gaming code which is operable when executed on to conduct a wagering game on which monetary value can be wagered, and a virtual input device. The virtual input device is operable to receive input from a user by detecting a position of a user input object such as a finger.

DETAILED DESCRIPTION

In the following detailed description of example embodiments of the invention, reference is made to specific examples by way of drawings and illustrations. These examples are described in sufficient detail to enable those skilled in the art to practice the invention, and serve to illustrate how the invention may be applied to various purposes or embodiments. Other embodiments of the invention exist and are within the scope of the invention, and logical, mechanical, electrical, and other changes may be made without departing from the subject or scope of the present invention. Features or limitations of various embodiments of the invention described herein, however essential to the example embodiments in which they are incorporated, do not limit the invention as a whole, and any reference to the invention, its elements, operation, and application do not limit the invention as a whole but serve only to define these example embodiments. The following detailed description does not, therefore, limit the scope of the invention, which is defined only by the appended claims.

One example embodiment of the invention comprises a computerized wagering game system including a gaming module comprising gaming code which is operable when executed on to conduct a wagering game on which monetary value can be wagered. The wagering game system also comprises a virtual input device operable to receive input from a user by detecting a position of the user in free space. The virtual input device is in various embodiments a virtual pointing device or a virtual keyboard, and detect the presence and position of an object such as a user finger in the virtual input device input area.

Figure 1:
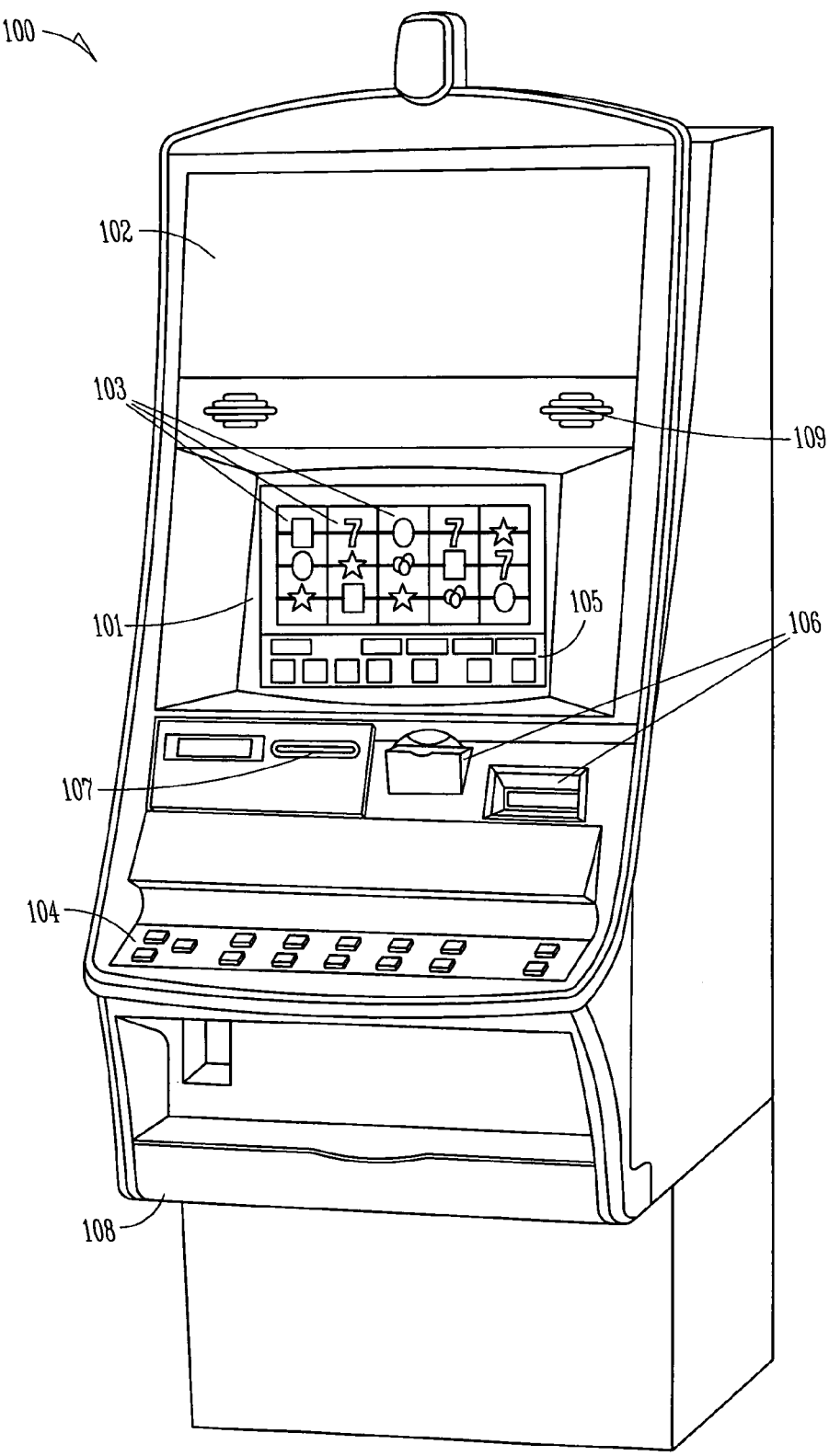
FIG. 1 shows a computerized wagering game machine, as may be used to practice some example embodiments of the invention.

FIG. 1 illustrates a typical computerized wagering game machine, as may be used to practice some embodiments of the present invention. The computerized gaming system shown generally at 100 is a video wagering game system, which displays information for at least one wagering game upon which monetary value can be wagered on video display 101. In a further example, a second video display 102 is provided as a part of a top-box assembly, such as to display a bonus game or other information. Video displays 101 and 102 are in various embodiments a CRT display, a plasma display, an LCD display, a surface conducting electron emitter display, or any other type of display suitable for displaying electronically provided display information. Alternate embodiments of the invention will have other game indicators, such as mechanical reels instead of the video graphics reels shown at 103 that comprise a part of a video slot machine wagering game.

A wagering game is presented using software within the wagering game machine, such as through instructions stored on a machine-readable medium such as a hard disk drive or nonvolatile memory. In some further example embodiments, some or all of the software stored in the wagering game machine is encrypted or is verified using a hash algorithm or encryption algorithm to ensure its authenticity and to verify that it has not been altered. For example, in one embodiment the wagering game software is loaded from nonvolatile memory in a compact flash card, and a hash value is calculated or a digital signature is derived to confirm that the data stored on the compact flash card has not been altered. The game of chance implemented via the loaded software takes various forms in different wagering game machines, including such well-known wagering games as reel slots, video poker, blackjack, craps, roulette, or hold 'em games. The wagering game is played and controlled with inputs such as various buttons 104 or via touchscreen overlay buttons 105 on video screen 101. In some alternate examples, other devices such as pull arm are used to initiate reel spin in this reel slot machine example are employed to provide other input interfaces to the game player.

Monetary value is typically wagered on the outcome of the games, such as with tokens, coins, bills, or cards that hold monetary value. The wagered value is conveyed to the machine through a changer 106 or a secure user identification module interface 107, and winnings are returned via the returned value card or through the coin tray 108. Sound is also provided through speakers 109, typically including audio indicators of game play, such as reel spins, credit bang-ups, and environmental or other sound effects or music to provide entertainment consistent with a theme of the computerized wagering game. In some further embodiments, the wagering game machine is coupled to a network, and is operable to use its network connection to receive wagering game data, track players and monetary value associated with a player, and to perform other such functions. In other embodiments, the wagering game system is a portable wagering game system, or has another format different from that illustrated in FIG. 1.

Figure 2:
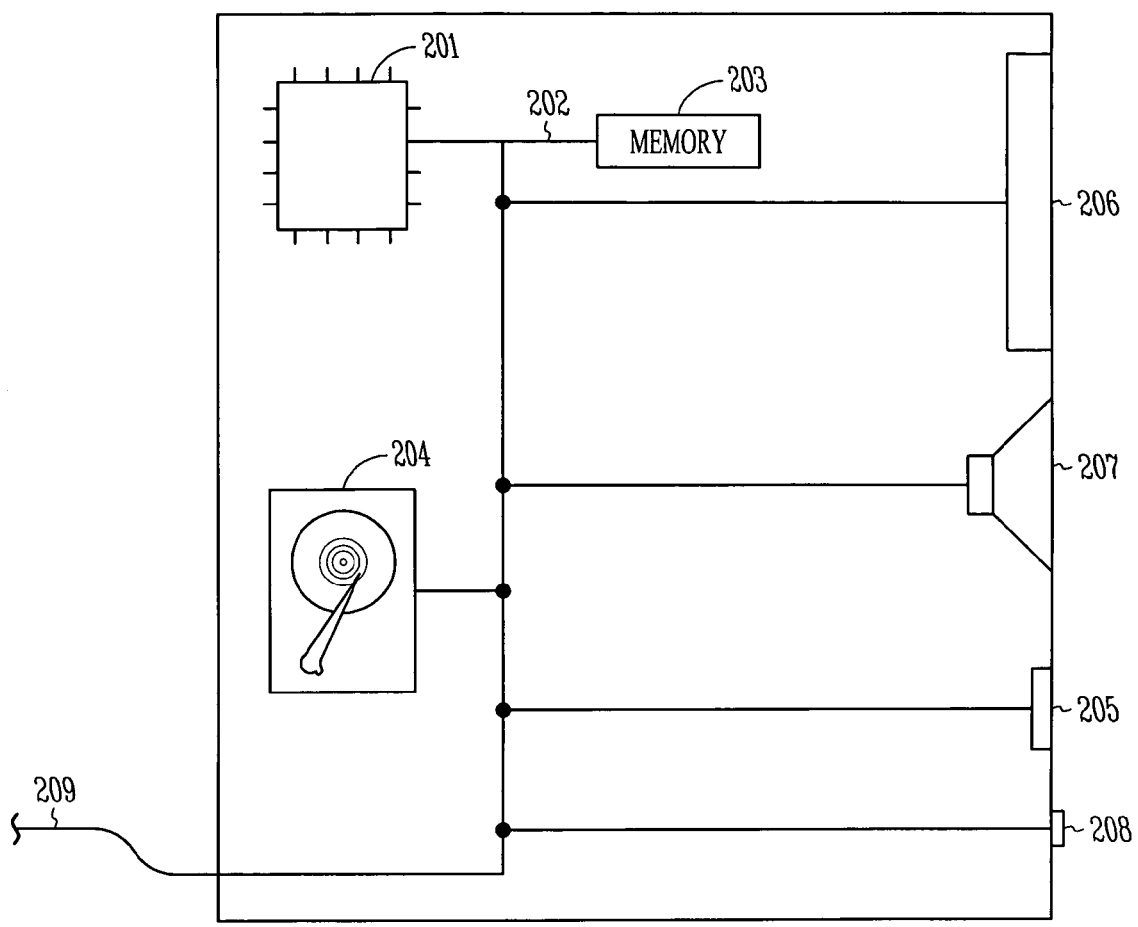
FIG. 2 is a block diagram of a wagering game system, consistent with some example embodiments of the invention.

FIG. 2 shows a block diagram of an example embodiment of a wagering game system. The wagering game system includes a processor 201, which is sometimes called a microprocessor, controller, or central processing unit (CPU). In some embodiments, more than one processor is present, or different types of processors are present in the wagering game system, such as using multiple processors to run gaming code, or using dedicated processors for audio, graphics, security, or other functions. The processor is coupled via a bus 202 to various other components, including memory 203 and nonvolatile storage 204. The nonvolatile storage is able to retain the data stored therein when power is removed, and in various embodiments takes the form of a hard disk drive, nonvolatile random access memory such as a compact flash card, or network-coupled storage. Further embodiments include additional data storage technologies, such as compact disc, DVD, or HD-DVD storage in the wagering game system.

The bus 202 also couples the processor and components to various other components, such as a value acceptor 205, which is in some embodiments a token acceptor, a card reader, or a biometric or wireless player identification reader. A touchscreen display 206 and speakers 207 serve to provide an interface between the wagering game system and a wagering game player, as do various other components such as buttons 208, pullarms, and joysticks. A network connection 209 couples the wagering game system to other wagering game machines and to a wagering gape server, such as to provide downloadable games or to provide accounting, player tracking, or other functions. These components are located in a wagering game machine cabinet such as that of FIG. 1 in some embodiments, but can be located in multiple enclosures comprising a wagering game system or outside a wagering game machine cabinet in other embodiments, or in alternate forms such as a wireless or mobile device.

In operation, the wagering game system loads program code from nonvolatile storage 204 into memory 203, and the processor 201 executes the program code to cause the wagering game system to perform desired functions such as to present a wagering game upon which monetary value can be wagered. This and other functions are provided by various modules in the computerized system such as an audio module, a game presentation module, or a touchscreen display module, where such modules comprise in some embodiments hardware, software, mechanical elements, manual intervention, and various combinations thereof. The wagering game machine is coupled to other wagering game machines, and to various other elements such as game servers, accounting servers, or community or progressive game servers via the network connection 209, and exchanges data with these machines via the network connection.

Input to the wagering game machine is often received through various input devices, such as a touchscreen display, buttons, or specialized devices such as a slot machine pullarm. But, with some wagering game machine formats such as a small portable wagering game machine, the amount of cabinet space to house multiple or large user input devices limits the user input capability of the wagering game system. Some embodiments of the invention seek to address this and other problems by providing a virtual user input device, such as a virtual keyboard or a virtual pointing device.

Figure 3:
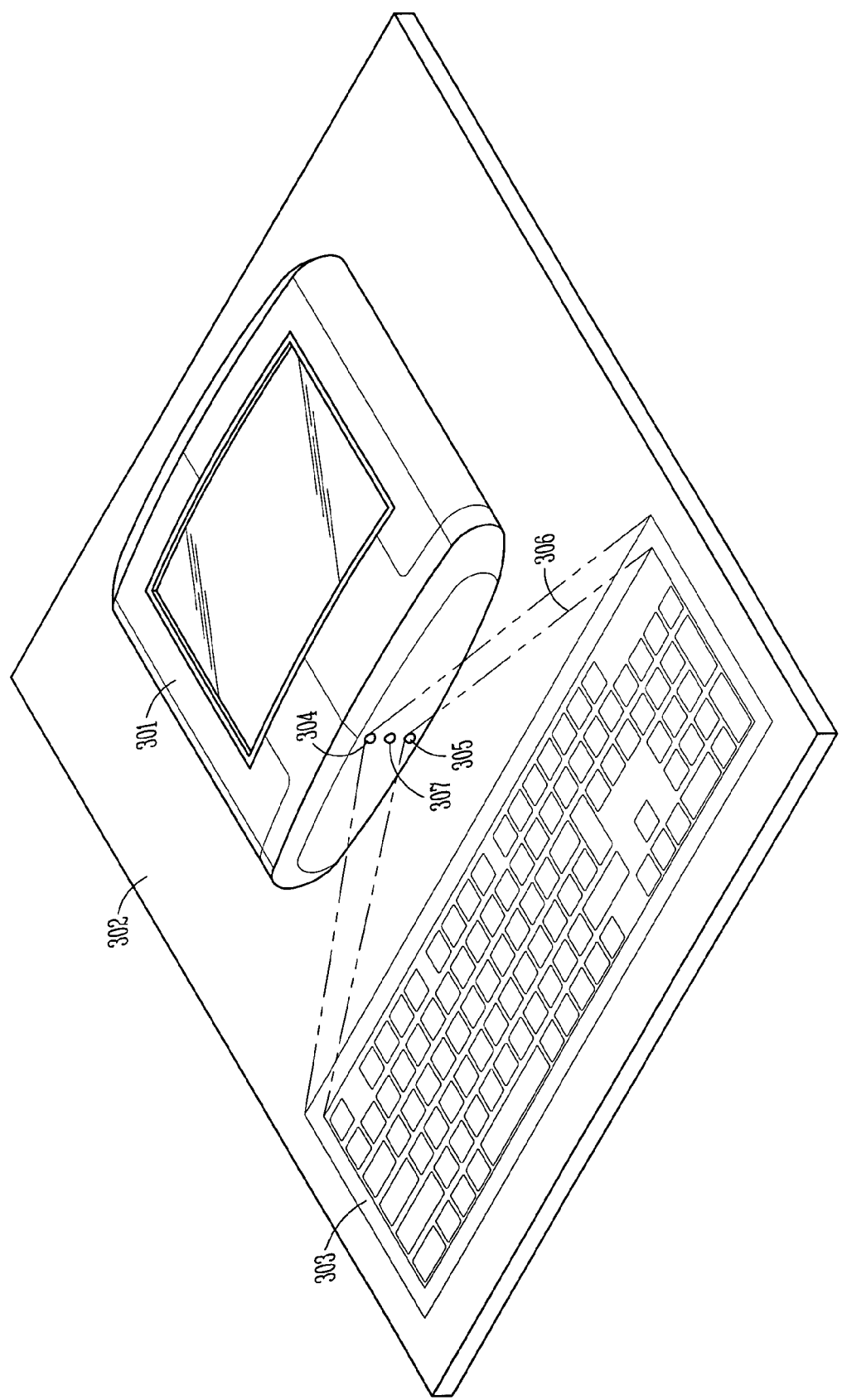
FIG. 3 illustrates a portable wagering game machine including a virtual input device, consistent with an example embodiment of the invention.

FIG. 3 illustrates a portable wagering game machine including a virtual input device, consistent with an example embodiment of the invention. The portable wagering game device 301 is placed on a flat surface 302, and projects a virtual input device representation onto the flat surface as shown at 303 via a projector 304. An infrared emitter 305 projects an infrared beam 306 across the projected image shown at 303, and an infrared sensor 307 detects the presence of a finger or other object in the infrared beam 306.

In a further embodiment, there are multiple infrared emitters or multiple infrared detectors, to aid in identifying the presence of a user such as a finger or other object in the area of the displayed virtual input device 303. In one such example, two infrared detectors and two infrared emitters are spaced horizontally across the portable wagering game device, enabling better two-dimensional detection of an object in the plane shown at 306. In an alternate embodiment, one or more ultrasonic sensors and emitters are used to perform a similar function, where ultrasonic emitters 305 produce an ultrasonic sound field 306 over the projected virtual input device 303 and ultrasonic detectors 307 detect the presence of a finger or other user object in the area of the virtual input device by monitoring the sound field 306.

The virtual input device is in one embodiment a keyboard, such as a standard computer keyboard or a language-specific keyboard selected based on the machine location or user preference. The user is able to operate the virtual keyboard much like a traditional keyboard, by using finger motions in the display area that are detected by emitters and sensors such as the ultrasonic and infrared examples discussed above. In another embodiment, the virtual input device is a virtual pointing device, which the user operates much like a touchpad. By moving his finger in the touchpad region such as may be projected from projector lens 304, the user is able to move a cursor on the screen. Similarly, other virtual input devices such as projected custom buttons can be implemented using hardware such as that of FIG. 3, and are within the scope of various embodiments of the invention.

Figure 4:
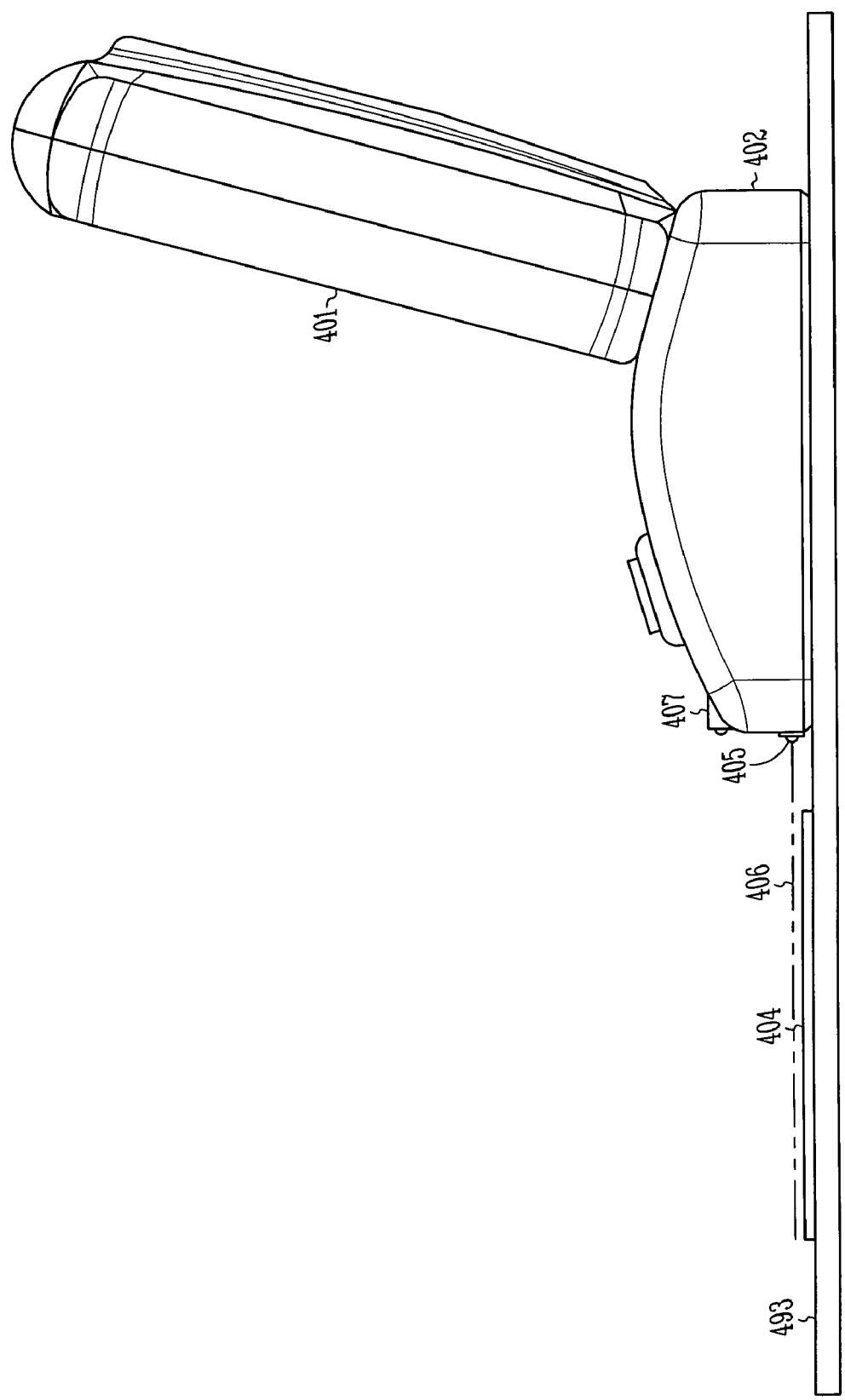
FIG. 4 illustrates an alternate portable wagering game device having a virtual input device, consistent with an example embodiment of the invention.

FIG. 4 shows an alternate portable wagering game device having a virtual input device, consistent with an example embodiment of the invention. In this example, a portable wagering game system 401 is placed in a specific location, such as a portable wagering game dock or cradle region 402 designed to receive and position the portable wagering game device. In a further embodiment, the dock provides recharging power, a network connection, or other features to the portable wagering game device.

A flat surface 403 adjacent to the dock 402 has a virtual input device region 404, such as a preprinted keyboard layout or a defined pointing device area. The portable wagering game device of this example therefore operates without a projected input device image, eliminating the need to provide and power a projector assembly within the portable wagering game device. One or more infrared emitters 405 projects an infrared beam or plane 406 over the virtual input device region 404, and an infrared sensor 407 is operable to detect presence of a user's finger or other object in the infrared region 406. The position of the detected object or finger is used in various embodiments to determine what key is being depressed on a virtual keyboard, what position the user is selecting in guiding a cursor on a virtual pointing device, or to receive other such input.

In alternate embodiments, the infrared emitters and sensors are replaced with other similar technologies, such as ultrasonic sensor and emitter assemblies, lasers, or other technologies. The printed virtual input device region 304 is in various embodiments a part of the surface, such as a table, while in other embodiments is a retractable part of the portable wagering game system or is stored in the portable wagering game system. In further embodiments, the image is not preprinted, but is provided by another means external to a projector located in the portable wagering game device. In one such example, the virtual input device image 404 is projected from another source, such as via a rear projection assembly, a fixed display device such as an LCD that is able to show different images, or is a backlit patterned template providing a single lit virtual input device image.

Figure 5:
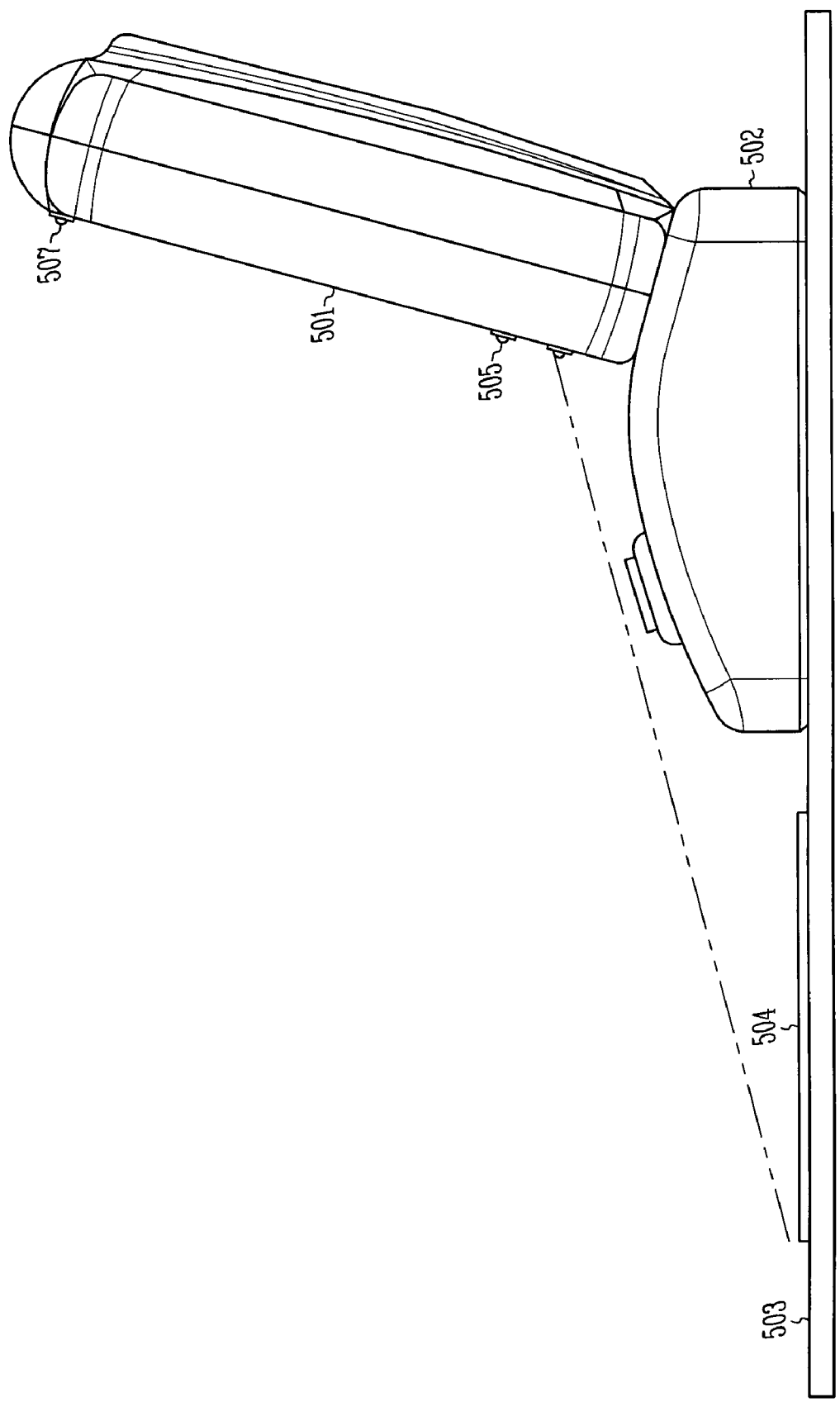
FIG. 5 illustrates another portable wagering game device having a virtual input device, consistent with an example embodiment of the invention.

FIG. 5 is an alternate embodiment of portable wagering game device having a virtual input device, consistent with an example embodiment of the invention. Here, the portable wagering game system 501 is placed in a specific location such as a portable wagering game dock or cradle region 502 designed to receive and position the portable wagering game device. A flat surface 405 adjacent to the dock 502 again has a virtual input device region 504, such as a preprinted keyboard layout or a defined pointing device area.

In this example, the one or more infrared emitters 505 projects an infrared beam or plane 506 over the virtual input device region 504 from the portable portion of the wagering game machine 501 rather than from the docking station 502, and the infrared sensor 507 that is operable to detect presence of a user's finger or other object in the infrared region 506 is also located in the portable portion of the wagering game machine. In other embodiments, the emitter and sensor are located in different portions of the wagering game machine, such as having the emitter located in the docking station and the sensor located in the portable portion of the wagering game machine system.

Figure 6:
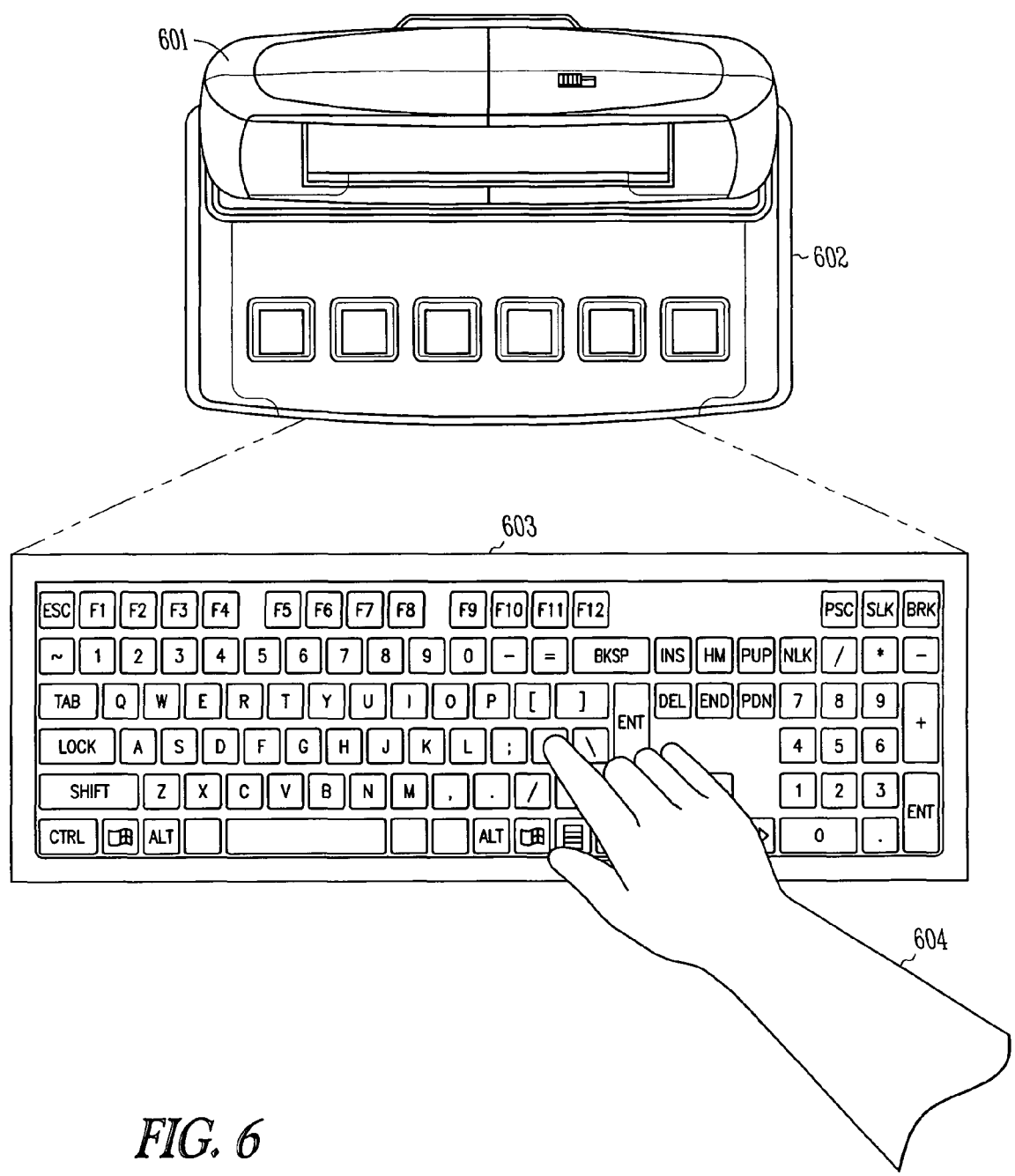
FIG. 6 is a top view of a portable wagering game system having a projected virtual input device, consistent with an example embodiment of the invention.

FIG. 6 is a top view of a portable wagering game system having a projected virtual input device, consistent with an example embodiment of the invention. The portable wagering game device 601 is here shown from the top as though it were sitting on a table viewed from above, and includes a relatively small touchscreen display area 602. In some situations, such as when entering user information, searching for specific wagering games, conducting e-mail or messaging, or other such activities, it will be beneficial to provide the user with a standard keyboard to facilitate easy entry of text. Due to the small size of the touchscreen display 602, and because the display will in some examples desirably be used to display the entered text as it is typed, using the touchscreen display to provide a full keyboard is not ideal. The virtual input device in other embodiments has a larger or smaller size than is shown here, and is oriented other than on a horizontal surface or perpendicularly from the wagering game system enclosure.

A projector and sensor assembly such as that of FIGS. 3-5 is used here to provide a projected virtual input device, such as the virtual keyboard shown at 603. When a user's finger touches or comes very near one of the virtual keys on the projected keyboard, the emitter/sensor assembly detects the presence and position of the finger and uses the information to generate keystroke input for the portable wagering game machine. Although the user may touch a table or other object while providing input, it is the position or presence of the user's finger or other object in the free space near the projected keyboard image that is sensed via the emitters and sensors, and used to provide input to the wagering game machine. In another embodiment, three-dimensional position of the user finger or other object is monitored to provide additional input to the wagering game system, such as for entering information or for enhancing game play.

In various further embodiments, the virtual keyboard is operable to display different keyboard configurations to receive input from those who speak other languages. A simplified Chinese keyboard, for example, may be presented when selected by a Chinese game player, or when the wagering game system is configured for use in Chinese-speaking regions.

Figure 7:
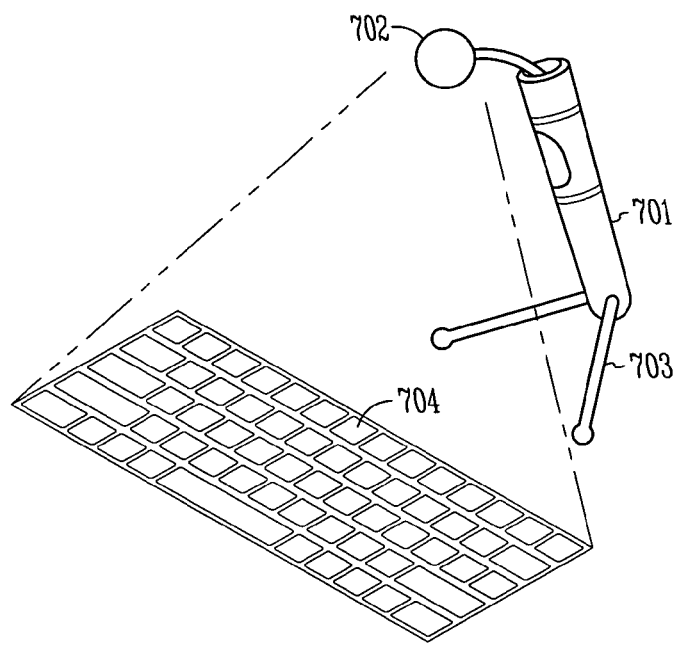
FIG. 7 is a portable pen wagering game system providing a virtual input device, consistent with an example embodiment of the invention.

FIG. 7 shows a portable pen wagering game system having a projected virtual input device, consistent with an example embodiment of the invention. In this embodiment, the size of the actual wagering game system terminal 701 is relatively small—about the size of a traditional pen. The pen-sized wagering game system includes a wireless network interface, as well as a projector element 702 operable to project a user input region such as keyboard 704 onto a flat surface. The pen also includes two flip-down legs 703, that can be stored in the pen and configured during use to support the pen in an upright position on a flat surface such as is shown.

The projected image in this embodiment comprises a keyboard 704 used to provide input, but in other embodiments comprises a typical wagering game machine image, such as a video poker or reel slot display, along with various inputs such as selection buttons or other input elements. This enables the projected image to serve as the only interface with the user, or to serve as a supplemental interface to a wagering game, such as to provide user input for a community game displayed on a community wagering game display. In such an example, multiple users can view the same wagering game on another display such as a community wall display, while providing individual input via wagering game device 701's virtual keyboard or other virtual input devices.

Figure 8:
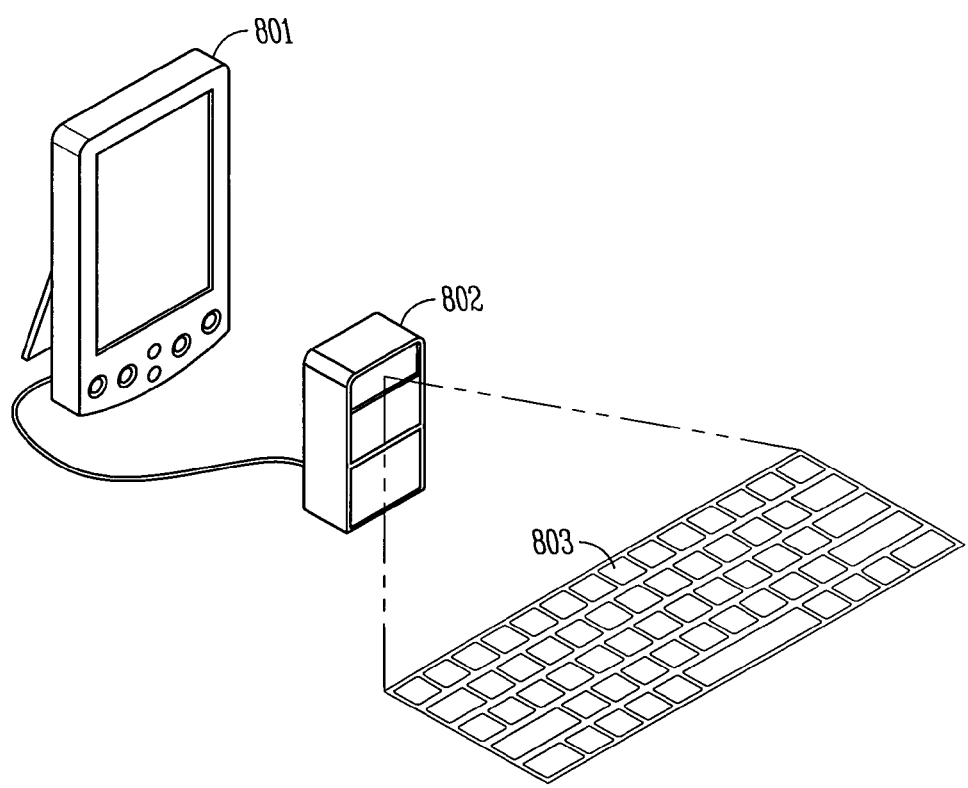
FIG. 8 is an alternate portable wagering game system coupled to a virtual input device system, consistent with an example embodiment of the invention.

FIG. 8 shows an alternate example of a portable wagering game machine having a virtual input device, consistent with an example embodiment of the invention. A portable wagering game device 801 has attached a virtual input projection device 802. The virtual input device 802 is attached in this example by a wire, and is moveable separately from the wagering game machine 801, but in other embodiments is in wireless communication with the wagering game machine or is physically a part of the wagering game machine.

Here, the virtual input device 802 projects a virtual input device such as a virtual keyboard 803 onto a flat surface, and a user provides input to the wagering game system by touching the projected keys. The input is used to control the wagering game system, to participate in a community wagering game, to perform wagering game system diagnostics or configuration, or to perform other such functions.

Figure 9:
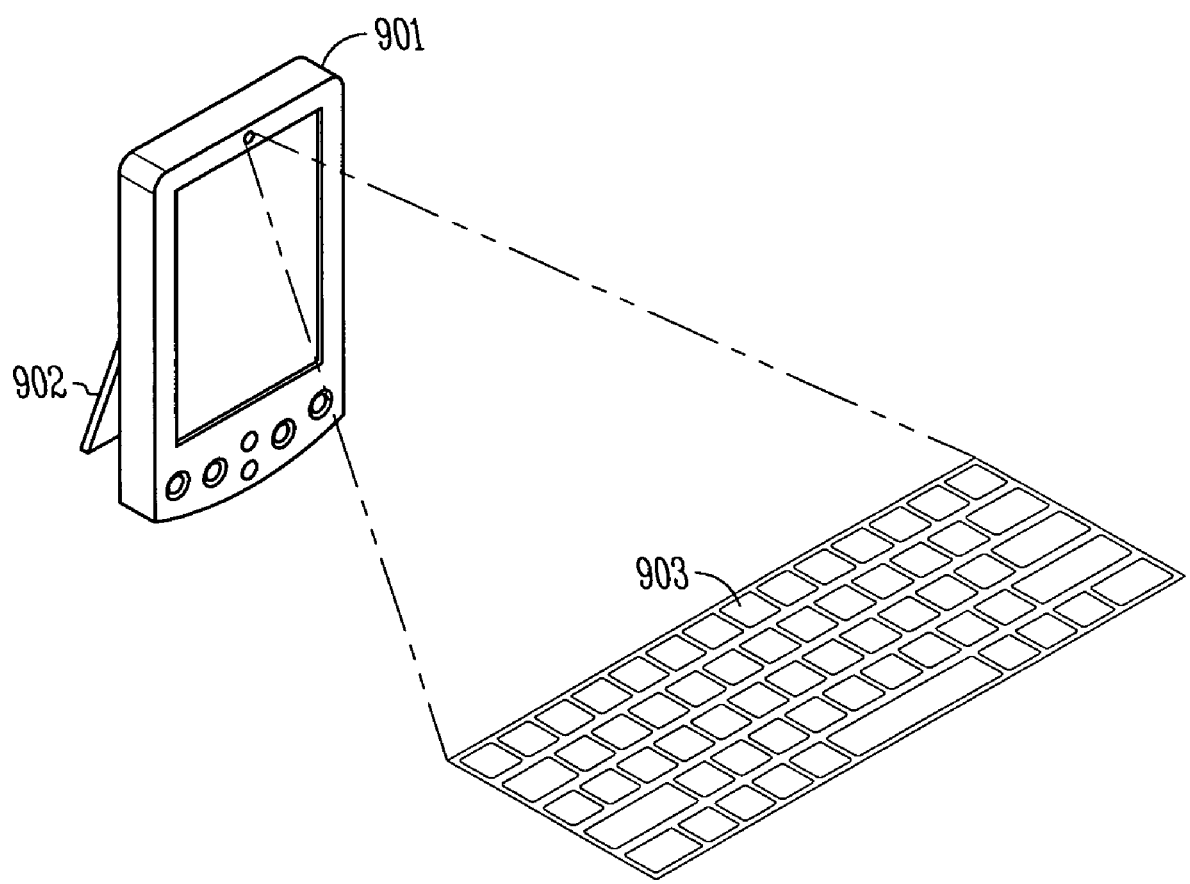
FIG. 9 shows a portable wagering game system that is operable to stand in an upright position, facilitating projection of a virtual wagering game device consistent with an example embodiment of the invention

FIG. 9 shows a portable wagering game system that is operable to stand in an upright position, facilitating projection of a virtual wagering game device consistent with an example embodiment of the invention. Here, the wagering game system 901 stands in an upright position on a flat surface via a support 902, through design of the wagering game system's base, or through other means such as a table support designed to receive and hold the portable wagering game system 901. The portable wagering game system 901 is operable to project a virtual input device such as the keyboard 903 onto the surface supporting the wagering game device, such that a user can touch the keys and provide input to a wagering game device.

In other embodiments, the portable wagering game device 901 will project an image of a wagering game or other wagering game elements, such as a traditional reel slot machine, a video poker wagering game, or other such wagering game representations. These wagering game images comprise virtual input devices in some embodiments, such that the projected image functions similar to a touchscreen device. A card player playing a video poker game can touch a projected card to hold that card, for example, or can touch a projected reel spin button to initiate reel spin of a projected video slot machine game. The user may provide more complex input by touching a region in the game to change the input device to a projected keyboard, such as the keyboard 903 of FIG. 9, before returning to the projected wagering game, or virtual input device keys can be provided adjacent to the projection of the virtual wagering game.

These examples show a variety of wagering game configurations that feature virtual wagering game input devices, including portable and stationary wagering game machines. The virtual input devices include virtual keyboards, virtual projected wagering game elements, and other input devices. The wagering game machines comprise a variety of forms, from large wagering game machine enclosures to portable wagering game systems and pen-sized wagering game machine virtual input devices. Various embodiments of these virtual input device systems provide the ability to project a virtual input device that changes, to provide a virtual input device that can be easily relocated as a wagering game player moves within a gaming area in a casino with a portable wagering game device, and to provide a virtual wagering game input device that is larger than the portable wagering game system in some embodiments.

The wagering game machine in other examples includes certain other features, such as a wagering game machine using a high-K gate dielectric in its processor or other semiconductor devices. This can result in improved power performance, and longer effective battery life.

In another example, security in the wagering game machine uses per-process, per-thread, or per-application security permissions for access to operating system resources such as network sockets, system calls, file access, and device drivers. This provides in some embodiments a computerized wagering game that is more resistant to being compromised, such that a compromised process does not necessarily result in a cheat being able to control all functions and devices in the wagering game machine. In one such example, SELinux is used to set security policies to restrict compromised processes from breaching security throughout a wagering game machine or game server.

Games executed in another example have multiple processes, which are launched by a central process or central multi-game application. For example, when a user selects a game to play, it is not simply an overlay on a single-process game that is already executing, but is a separately executed game launched from the central game process. This makes it easier to develop and debug new wagering games, improves overall system performance, and enables overlay of different themes and different types of themes on different separately executed games.

The examples presented here show how a wagering game machine such as a portable wagering game system can use a virtual input device to provide a user with a better interface to the wagering game system. Virtual keyboards, virtual pointing devices, and other virtual input devices are provided in different embodiments using a variety of fixed or projected virtual input device representations, and technologies such as infrared, ultrasound, and other sensing systems are used to detect user input. Although specific embodiments have been illustrated and described herein, it will be appreciated by those of ordinary skill in the art that any arrangement which is calculated to achieve the same purpose may be substituted for the specific embodiments shown. This application is intended to cover any adaptations or variations of the example embodiments of the invention described herein. It is intended that this invention be limited only by the claims, and the full scope of equivalents thereof.

The invention claimed is:

1. A computerized wagering game system, comprising:
a wagering game module operable to conduct a video poker wagering game upon which monetary value can be wagered;
a projector element operable to project a virtual input device on a flat surface, the virtual input device including a video presentation of the video poker wagering game with at least one projected card, the projected virtual input device being the only display interface of the computerized wagering game system; and
at least one sensor to detect a user selecting the projected card in the virtual input device by detecting a position of the user in free space, wherein the wagering game module is operable to hold the selected projected card.

2. The computerized wagering game system of claim 1, wherein the virtual input device comprises at least one of: a virtual pointing device or a virtual keyboard.

3. The computerized wagering game system of claim 1, wherein the position of the user in free space comprises the position of the user's finger in a two-dimensional plane.

4. The computerized wagering game system of claim 1, wherein the wagering game system is a portable wagering game machine.

5. The computerized wagering game system of claim 1, wherein the at least one sensor comprises one or more infrared emitters and one or more infrared sensors.

6. The computerized wagering game system of claim 1, wherein the at least one sensor comprises one or more ultrasonic emitters and one or more ultrasonic sensors.

7. The computerized wagering game system of claim 1, wherein the projected virtual input device comprises a keyboard representation.

8. The computerized wagering game system of claim 1, wherein the projected virtual input device comprises a pointing device area.

9. The computerized wagering game system of claim 1, wherein the input region comprises a three-dimensional space and wherein the position of the user in free space comprises the position of the user's finger in a three-dimensional space.

10. The computerized wagering game system of claim 1, wherein the projected virtual input device is used as an input device to a community wagering game.

11. The computerized wagering game system of claim 1, wherein the projected virtual input device includes a region to change the virtual input device to include a keyboard, and when the sensor detects the user touching the region, the projector element projects a virtual keyboard.

12. A method of operating a computerized wagering game system, comprising:
conducting a video poker wagering game upon which monetary value can be wagered; projecting a virtual input device on a flat surface using a projector element of a portable wagering game system, the virtual input device including a video presentation of the video poker wagering game with at least one projected card, the projected virtual input device being the only display interface of the portable wagering game system;
detecting, using at least one sensor, a user selecting the projected card in the virtual input device by detecting a position of the user in free space; and
in response to the detecting the selection of the projected card, hold the card in the video poker wagering game.

13. The method of operating a computerized wagering game system of claim 12, wherein the virtual input device comprises at least one of: a virtual pointing device or a virtual keyboard.

14. The method of operating a computerized wagering game system of claim 12, wherein the position of the user in free space comprises the position of the user's finger in a two-dimensional plane.

15. The method of operating a computerized wagering game system of claim 12, wherein receiving input from a user in the virtual input device comprises emitting infrared light from one or more infrared emitters and detecting the presence of an object in the emitted infrared light via one or more infrared sensors.

16. The method of operating a computerized wagering game system of claim 12, wherein receiving input from a user in the virtual input device comprises emitting sound from one or more ultrasonic sound emitters and detecting the presence of an object in the emitted ultrasonic sound via one or more ultrasonic sensors.

17. The method of claim 12, wherein the projected virtual input device is used as an input device to a community wagering game, the community wagering game displayed on a community wagering game display.

18. The method of claim 12 comprising:
detecting, using the at least one sensor, the user selecting a region in the virtual input device and, in response, changing the virtual input device to include a keyboard.

19. A machine-readable storage device with instructions stored thereon, the instructions when executed operable to cause a computerized wagering game machine to:
conduct a video poker wagering game upon which monetary value can be wagered;
project a virtual input device on a flat surface using a projector element of a portable wagering game system, the virtual input device including a video presentation of the video poker wagering game with at least one projected card, the projected virtual input device being the only display interface of the computerized wagering game machine;
detect, using at least one sensor, a user selecting the projected card in the selectively virtual input device by deriving a position of the user in free space; and
in response to the detecting the selection of the projected card, hold the card in the video poker wagering game.

20. The machine-readable storage device of claim 19, wherein deriving the position of the user in free space comprises deriving the position of the user relative to the input region.

21. The machine-readable storage device of claim 19, wherein the projected virtual input device is used as an input device to a community wagering game.

22. The machine-readable storage device of claim 19, wherein the projected virtual input device includes a region to change the virtual input device to include a keyboard, and when the sensor detects the user touching the region, the projector element projects a virtual keyboard.

23. A computerized wagering game system, comprising:

a wagering game module operable to conduct a video poker wagering game upon which monetary value can be wagered;

a projector element operable to project a virtual input device on a flat surface, the virtual input device including an image of the video poker wagering game with at least one projected card of the video poker wagering game and a region to change the virtual input device to include a virtual keyboard, the projected virtual input device being the only display interface of the computerized wagering game system; and at least one sensor to detect a user selecting the at least one projected card in the virtual input device by detecting a position of the user in free space, wherein the wagering game module is operable to hold the selected projected card.

24. The game system of claim 23, wherein the at least one sensor detects the user touching the region and, in response, the projector element projects a virtual keyboard adjacent to the image of the video poker wagering game.

25. The game system of claim 23, wherein the at least one sensor detects the user touching the region and, in response, the virtual input device is changed from the image of the video poker wagering game to a virtual keyboard.

26. The computerized wagering game system of claim 23, wherein the projected virtual input device is used as an input device to a community wagering game.

* * * * *